(12) United States Patent
Konanur et al.

(10) Patent No.: US 9,922,619 B2
(45) Date of Patent: Mar. 20, 2018

(54) COMPUTING DEVICE WITH A SECONDARY DISPLAY

(71) Applicant: Intel Corporation, Santa Clara, CA (US)

(72) Inventors: Anand S. Konanur, San Jose, CA (US); Ulun Karacaoglu, San Diego, CA (US); Justin M. Huttula, Hillsboro, OR (US); Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/670,095

(22) Filed: Mar. 26, 2015

(65) Prior Publication Data

US 2016/0180805 A1 Jun. 23, 2016

Related U.S. Application Data

(63) Continuation-in-part of application No. 14/581,656, filed on Dec. 23, 2014.

(51) Int. Cl.
*G09G 5/00* (2006.01)
*G06F 3/14* (2006.01)

(52) U.S. Cl.
CPC .......... *G09G 5/006* (2013.01); *G06F 3/1423* (2013.01); *G09G 2330/021* (2013.01); *G09G 2330/023* (2013.01); *G09G 2370/16* (2013.01); *G09G 2380/14* (2013.01)

(58) Field of Classification Search
CPC ............ G06F 3/1423; G09G 2330/021; G09G 2370/16
See application file for complete search history.

(56) References Cited

U.S. PATENT DOCUMENTS

| | | | |
|---|---|---|---|
| 6,489,932 B1 * | 12/2002 | Chitturi ................. | G06F 1/1601 345/173 |
| 7,941,194 B2 * | 5/2011 | Ganwani ................ | H01Q 1/241 455/11.1 |
| 8,660,491 B1 | 2/2014 | Tran | |
| 8,907,858 B2 | 12/2014 | Yang et al. | |
| 2009/0231109 A1 | 9/2009 | Reichert et al. | |
| 2011/0012717 A1 | 1/2011 | Pance et al. | |
| 2012/0086658 A1 * | 4/2012 | Moradian ............. | G06F 1/1641 345/173 |
| 2012/0220219 A1 * | 8/2012 | Hill ..................... | G06K 19/0776 455/41.1 |
| 2013/0176237 A1 * | 7/2013 | Chu ..................... | G06F 3/1431 345/173 |

(Continued)

OTHER PUBLICATIONS

PCT International Search Report, PCT Application No. PCT/US2015/054165, dated Feb. 22, 2016, e pages.

(Continued)

*Primary Examiner* — Nelson Rosario
*Assistant Examiner* — Chun-Nan Lin
(74) *Attorney, Agent, or Firm* — International IP Law Group, P.L.L.C.

(57) ABSTRACT

Disclosed herein is a computing device configured to send display data to a display through a near-field communication (NFC) interface. The computing device includes a chassis, a primary display, and a near-field communication interface to transmit display data to a secondary display.

21 Claims, 7 Drawing Sheets

(56) References Cited

U.S. PATENT DOCUMENTS

| | | | |
|---|---|---|---|
| 2013/0222224 A1* | 8/2013 | Eriksson | G06F 3/1423 |
| | | | 345/156 |
| 2013/0222266 A1* | 8/2013 | Gardenfors | G06F 3/1446 |
| | | | 345/173 |
| 2014/0011543 A1 | 1/2014 | Li et al. | |
| 2014/0015756 A1* | 1/2014 | Yang | G06F 3/041 |
| | | | 345/168 |
| 2014/0111475 A1 | 4/2014 | Bae | |
| 2014/0253520 A1 | 9/2014 | Cueto et al. | |
| 2014/0362837 A1* | 12/2014 | Yang | H04B 5/0031 |
| | | | 370/338 |
| 2015/0084871 A1 | 3/2015 | Yarvis et al. | |
| 2015/0091805 A1 | 4/2015 | Mahajan et al. | |
| 2015/0091806 A1 | 4/2015 | Mahajan et al. | |
| 2015/0116296 A1 | 4/2015 | Greene | |
| 2015/0186986 A1* | 7/2015 | Voege | G06F 1/166 |
| | | | 345/156 |
| 2015/0243245 A1* | 8/2015 | Jung | H04W 52/027 |
| | | | 345/520 |
| 2016/0119548 A1* | 4/2016 | Geurts et al. | H01Q 1/125 |
| | | | 348/207.1 |
| 2016/0162241 A1* | 6/2016 | An | G06F 3/1423 |
| | | | 345/1.3 |

OTHER PUBLICATIONS

Yarvis, et al., "Customized Display and Function for Keys on a Keyboard", I.N. Provisional Patent D Application No. 4363/CHE/2013, filed on Sep. 26, 2013, 13 pages.

Zhang et al., "MIMO Broadcasting for Simultaneous Wireless Information and Power Transfer", IEEE transactions on wireless communications, vol. 12, May 5, 2013. pp. 1989-1996.

* cited by examiner

COMPUTING DEVICE WITH A SECONDARY DISPLAY

CROSS REFERENCE TO RELATED APPLICATIONS

This application is a continuation-in-part of U.S. patent application Ser. No. 14/581,656, filed Dec. 23, 2014, the contents of which are hereby incorporated by reference.

TECHNICAL FIELD

The present disclosure relates to a computing device with a secondary display. More specifically, the present disclosure describes techniques for implementing a detachable, low-power secondary display in a computing device such as desktop, laptop, tablet computer, or smart phone.

BACKGROUND ART

Devices such as phones, tablets, and Personal Computers (PCs) are getting thinner. At the same time, some users prefer to have more display area or secondary displays to receive on the go notifications, messages, text messages, or to display messages that are a form of self-expression, similar to a bumper sticker for a PC. However, such a secondary display adds mass to the device, increases the cost, and may affect the battery life. Therefore, some users may prefer not to have a secondary display.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure provides techniques for implementing a detachable secondary display for a computing device. The computing device may be a small form factor device such as a smart phone, laptop, Ultrabook, or tablet computer, for example. The detachable secondary display can be an optional feature that can be added by users that want a secondary display. The secondary display can be customized by the user to display various types of information, including messages, data, and expressive content. In some examples, the secondary display is a bi-stable display such as electronic paper (E-paper), which can maintain an image after power is removed. Such a secondary display will result in reduced power usage and can enable the user to remove the secondary display from any power source while still maintaining a desired image.

Communication between the computing device and the secondary display may be accomplished through a short-range wireless technology, such as Near Field Communication (NFC). Although NFC communication protocols may be defined by published standards, the term "near-field communications" refers to any communication technique that relies on a near-field signal, whether or not it adheres to a standard NFC protocol. The NFC communication enables the computing device to send display data to the secondary display and also provides the secondary display's operating power. In this way, the secondary display can be very easily coupled to the computing device, and can be decoupled without losing the display image. The secondary display can also be very simple and durable due to its lack of a power source or receptacles for receiving a power cord or communications connectors. Additionally, the chassis of the host computing device does not have to support any extra pins or docking connectors. Various examples of a computing device with a secondary display are described in more detail below.

Figure 1:
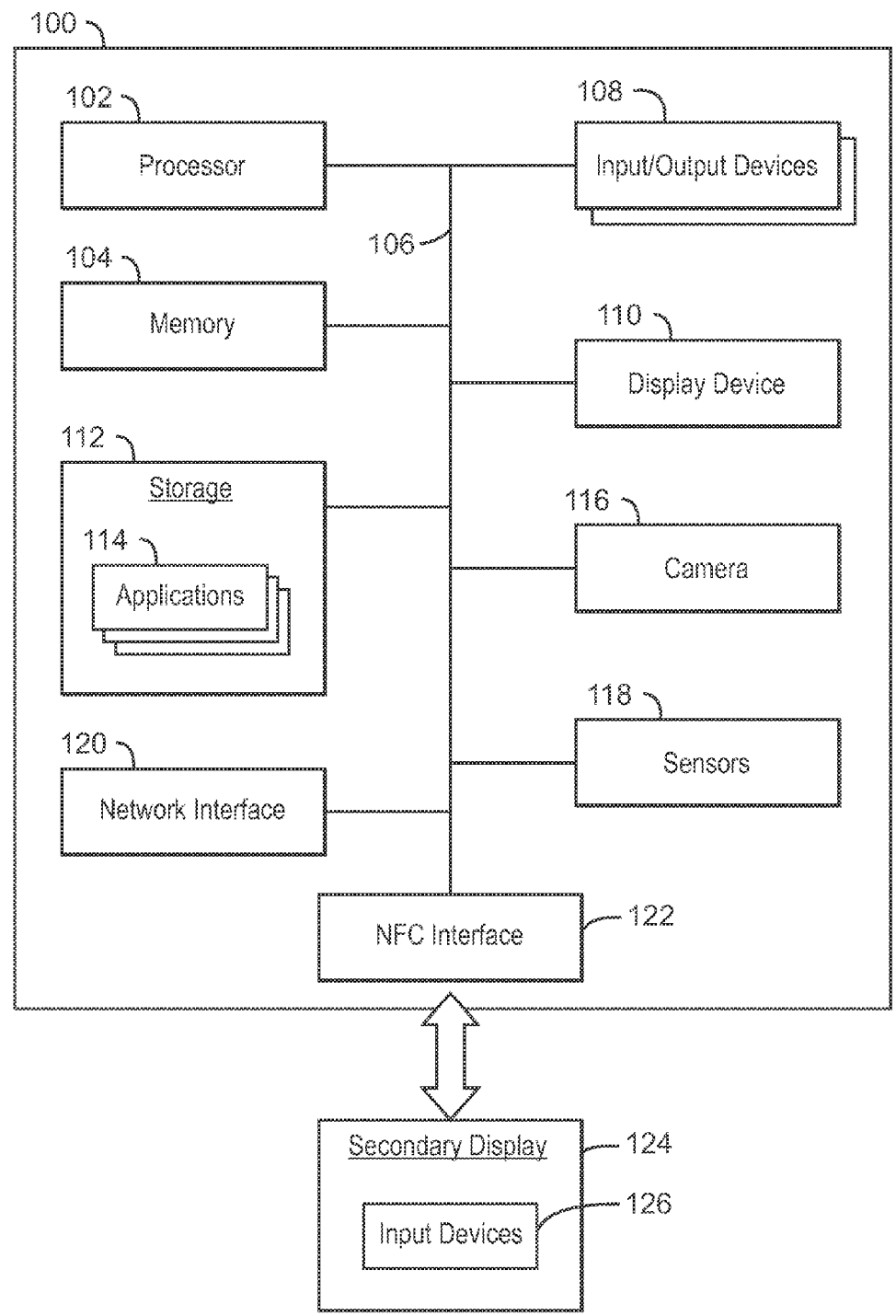
FIG. 1 is a block diagram of a computing device configured to be communicate with a secondary display device.

FIG. 1 is a block diagram of a computing device configured to be communicate with a secondary display device. The computing device 100 may be any type of computing device, such as a mobile phone, a smart phone, a laptop computer, or a tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The instructions that are executed by the processor 102 may be used to implement a method that includes determining two or more orientations corresponding to two or more members of the computing device 100 relative to the environment.

The processor 102 may be connected through a bus 106 to one or more input/output (I/O) devices 108. The I/O devices 108 may include, for example, a keyboard and a pointing device, wherein the pointing device may include a touchpad or a touchscreen, among others. The I/O devices 108 may be built-in components of the computing device 100, or may be devices that are externally connected to the computing device 100.

The processor 102 may also be linked through the bus 106 to a display device 110. The display device 110 may include a display screen that is a built-in component of the computing device 100. The display device 110 may also include a computer monitor, television, or projector, among others, that is externally connected to the computing device 100. The display device 110 is the primary display for the computing device 100 and may be a liquid crystal display (LCD) and may be incorporated with a touchscreen.

The computing device 100 can also include a storage device 112. The storage device 112 is a physical, non-transitory memory such as a hard drive, an optical drive, a flash drive, an array of drives, or any combinations thereof. The storage device 112 can store user data, such as audio files, video files, audio/video files, and picture files, among others. The storage device 112 can also store programming code such as device drivers, operating systems, software applications 114, and the like. The programming code stored to the storage device 112 may be executed by the processor 102 or any other processors that may be included in the computing device 100.

The computing device 100 can also include a camera 116. The camera 116 can be any suitable type of camera and can be configured to capture still images or video. The computing device 100 can also include one or more sensors 118, including orientation sensors, voltage sensors, and temperature sensors, among others. An orientation sensor may include, for example, a magnetometer, an accelerometer, a gyroscope, and the like. The orientation sensor may be used to collect data relating to the orientation of the computing device 100. A voltage sensor may be used to determine the status or a component of the computing device 100, such as the charge on a battery. Temperature sensors may also be used to determine the status or a component, such as the temperature of the processor 102.

The computing device 100 can also include a network interface 120 that enables the computing device 100 to connect to a network. In some embodiments, the network interface 120 may be a wireless interface that enables the computing device to connect to a wireless network, such as a WiFi network or a cellular network. The computing device 100 can also include more than one network interface 120. Through the network interfaces 120, the computing device 100 can send and receive phone calls, text messages, connect to private Local Area Networks, connect to the Internet, download software applications, and download data or media content, among others.

The computing device 100 also includes an NFC interface 122 that enables the computing device 100 to support an optional secondary display 124. The NFC interface 122 can be any suitable near-field communication interface. The secondary display 124 may be a low-power display, such as an electronic paper (E-paper) display or any other type of bistable display. The secondary display 124 can receive display data from the computing device 100 through the NFC interface 122. As used herein, the term display data refers to the digital image data that is used to drive the pixels of a display screen. The secondary display 124 can also receive electrical power through the NFC interface. In some examples, the secondary display 124 includes one or more input devices 126, such as external buttons. The input devices 126 enable a user to generate information that can be communicated from the secondary display 124 to the computing device 100 through the NFC interface 122. In some examples, the secondary display 124 lacks any type of input device.

The secondary display 124 may be configured to be held in close proximity to the computing device 100. For example, the secondary display 124 may be included in a computer case or phone cover, for example. In some examples, the secondary display 124 can be attached to the computing device 100 by a mechanism that makes the secondary display 124 easily attachable and detachable. For example, the secondary display 124 be held against an external surface of the computing device 100 through the use of bolts, snaps, latches, or other mechanisms that can be quickly engaged or disengaged. Various physical configurations are described more fully in relation to FIGS. 3-6.

Several useful features can be realized through the use of the secondary display 124 disclosed herein. In some examples, the secondary display 124 can be configured to display personalization information. For example, a user may configure the secondary display 124 to display decorative features, such as a pattern, an image, or a saying. The user may also configure the secondary display 124 to display ownership information, such as the user's name, phone number, address, business organization, or instructions for how and where to return the computing device in the event of loss. A hospital could also use the secondary display 124 as a medial chart to display critical information about a patient to hospital staff. The persistent nature of the display screen can help to ensure that such information is not lost due to loss of power to the computing device 100.

The user may also use the secondary display 124 to display information that the user wants to be readily accessible without having to open the computing device 100, power on the computing device 100, or enter a password to access the computing device 100. Such information may include reminders, notes, a grocery list, map directions, admission tickets, a security badge, boarding passes, and many others. The secondary display 124 may also be used to display continuously updating data related to an interest of the user, such as selected stock quotes, weather information, news headlines, date and time. Information displayed on the secondary display 124 may be received from the Internet or other network through the network interface 120. In the case of a smart phone, the secondary display 124 may be configured to display call information, such as the identification of an incoming caller. The secondary display 124 may also be configured to alert the user to the existence of a new voicemail or text message and may be configured to display all or a portion of a text message. The secondary display may also be used to display information about the computing device 100, including status information such as battery power levels, battery time remaining, whether the computing device 100 is powered on or in a sleep mode, model information, and others.

Any one of the applications 114 may be configured to take control of the secondary display 124 at different times. For example, one of the applications 114 may be a personalization application that enables the user to generate aesthetic content for the secondary display 124. Another application may be an internet browser that can enable a Website to send content to the secondary display 124. Another application may be a note application that enables a user to send a selected note or notes to the secondary display 124. A camera application may have an option that enables the user to capture an image via the camera 116 and send it to the secondary display 124.

The secondary display 124 may also be used to display product information in a retail setting. The product information can include price, product specifications, and advertising material, among other things. The secondary display 124 can also display information such as Quick Response (QR) codes and bar codes, which may be used to facilitate payment processing at a point of sale or enable a user to link to additional information through a Web browser, for example. The retail information can be programmed by the manufacturer, the retailer, or both. Upon purchase, the secondary display 124 can be re-purposed by the user and the product information can be replaced.

Figure 2:
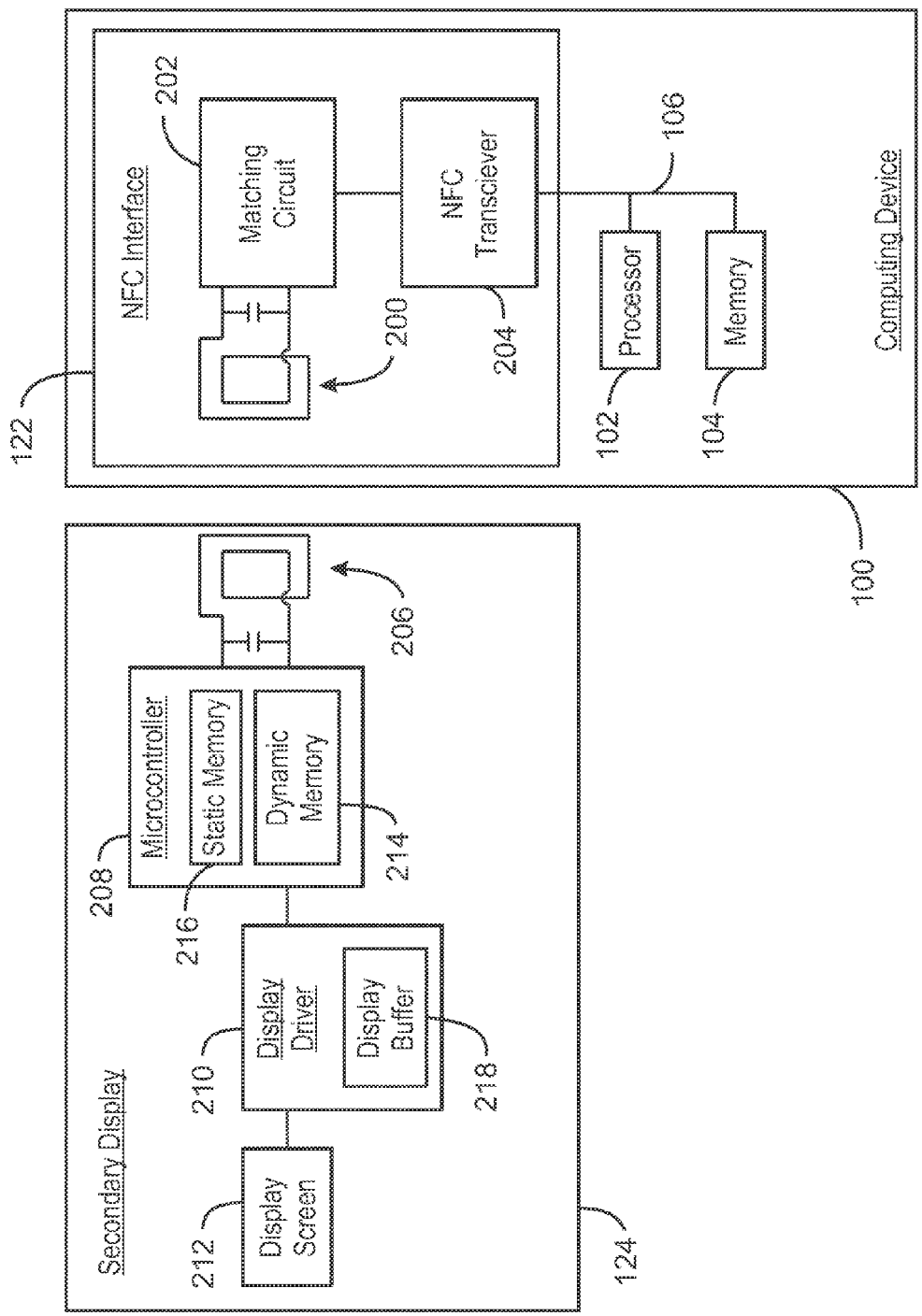
FIG. 2 is a block diagram showing an example of a circuit that could be used to implement a secondary display.

FIG. 2 is a block diagram showing an example of a circuit that could be used to implement a secondary display. FIG. 2 shows the secondary display 124 and the computing device 100. As discussed above, the computing device 100 includes a processor 102, a memory device 104, and an NFC interface 122. The NFC interface 122 of FIG. 2 includes an antenna 200, a matching circuit 202, and an NFC transceiver 204. Although shown as a coil, the antenna 200 can be any suitable type of radio antenna that can be used for near-field communications. The NFC transceiver 204 receives digital data and converts the digital data into signals for driving the antenna 200. The NFC transceiver 204 can also receive analog signals received by the antenna 200, convert the analog signals into digital data and transmit the digital data onto the bus 106. The matching circuit 202 is an impedance matching circuit that facilitates the transmission of electrical signals between the antenna 200 and the NFC transceiver 204.

Also shown in FIG. 2 is the secondary display 124. The secondary display includes an antenna 206, a microcontroller 208, a display driver 210, and a display screen 212. The antenna 206 can receive data and electrical power transmitted from the antenna 200. In some examples, the secondary display does not include a power supply and is fully powered by the energy radiated by the antenna 200 of the NFC interface 122. In some examples, the NFC interface 122 may be configured to transmit data to the secondary display 124 at speeds of approximately 800 kilobits per second (kbps) or greater and deliver power to the secondary display of approximately 10 milliwatts (mW). The NFC interface 122 and the secondary display can be configured to operate at 13.56 MHz. However, the NFC interface 122 can operate at any suitable frequency or range of frequencies. The data transmitted by the computing device 100 to the secondary display 124 can include any suitable display data that can be used by the display driver 210 for driving the display screen 212.

The microcontroller 208 is configured to receive the data transmitted from the NFC interface 122 and optionally re-transmit data back to the NFC interface 122. The antenna 206 exposes registers in the microcontroller 208 that can be written to by the NFC interface 122 with a message string. The writable memory registers are included in the dynamic memory 214 of the microcontroller 208. Upon successfully decoding the data received from the NFC interface 122, the microcontroller 208 can respond by transmitting an acknowledgement back to the NFC interface 122.

If the message string represents display data, the message string can be retrieved by the display driver 210 and stored within the display buffer 218. The display driver 210 then uses the received display data to drive the display screen 212. The display driver 210 may be connected to the microcontroller 208 through a low power bus interface such as Inter-Integrated Circuit (I2C) or Serial Peripheral Interface (SPI).

The microcontroller 208 may also be configured to transmit data back to the NFC interface 122. Such data may include information that relates to features of the secondary display 124, such as product identifiers, display screen resolution, display screen dimensions, user identifiers, and others. Data related to features of the secondary display 124 can be stored to a static memory 216 and transmitted to the computing device 100 upon receiving a request for the data from the computing device 100. The data transmitted back to the NFC interface 122 can also include user input data, which may be generated by the user through the input devices.

Figure 3:
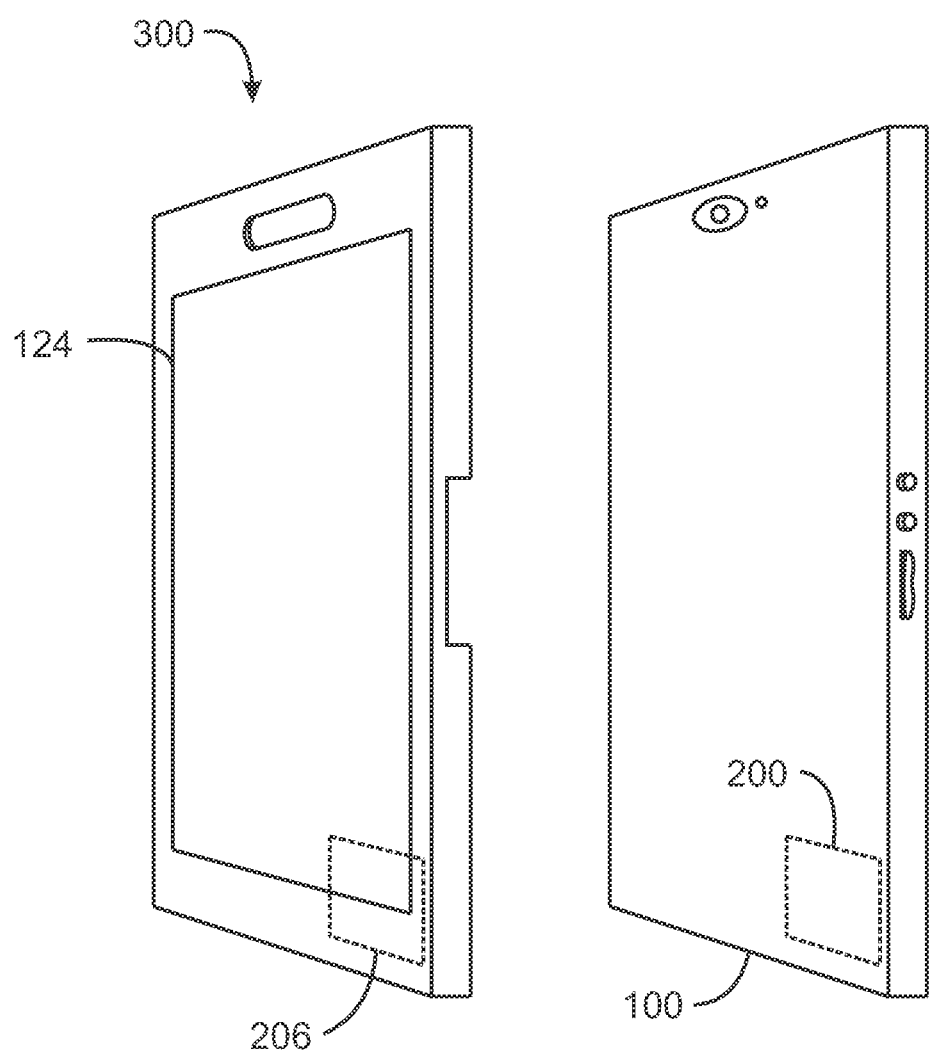
FIG. 3 is an example of a secondary display included in a cover for a computing device.

FIG. 3 is an example of a secondary display included in a cover for a computing device. The computing device 100 shown in FIG. 3 is a mobile phone, such as a smart phone. However, the computing device 100 could also be a laptop computer or a tablet computer, among others. The computing device 100 could also be a flip phone in some examples. The cover 300 may be any suitable type of cover or case and may be configured to protect the mobile phone from damage or wear. The cover includes the secondary display 124, which may be any suitable size and may be larger or smaller than the display shown in FIG. 3. When the cover 300 is disposed over the computing device 100, the antenna 206 in the cover 300 is positioned adjacent to the antenna 200 in the computing device 100, enabling communication between the computing device 100 and the secondary display 124. As noted above, the secondary display 124 may be an E-paper display.

Various useful features can be realized with this configuration. For example, the user may want to be reminded of a certain activity or meeting to take place in the near future. The user could have an electronic note or other type of electronic reminder stored within the mobile phone. However, to be effective, the user would have to specifically search for the reminder, which might include several steps such as entering a password and running an application. Using the secondary display disclosed herein, the user could send the reminder to the secondary display 124. In this way, the note would always be present in a manner similar to the user placing a sticky note on the outside of the phone case. Furthermore, the note would be present even if the mobile phone was turned off or ran out of battery power.

Figure 4:
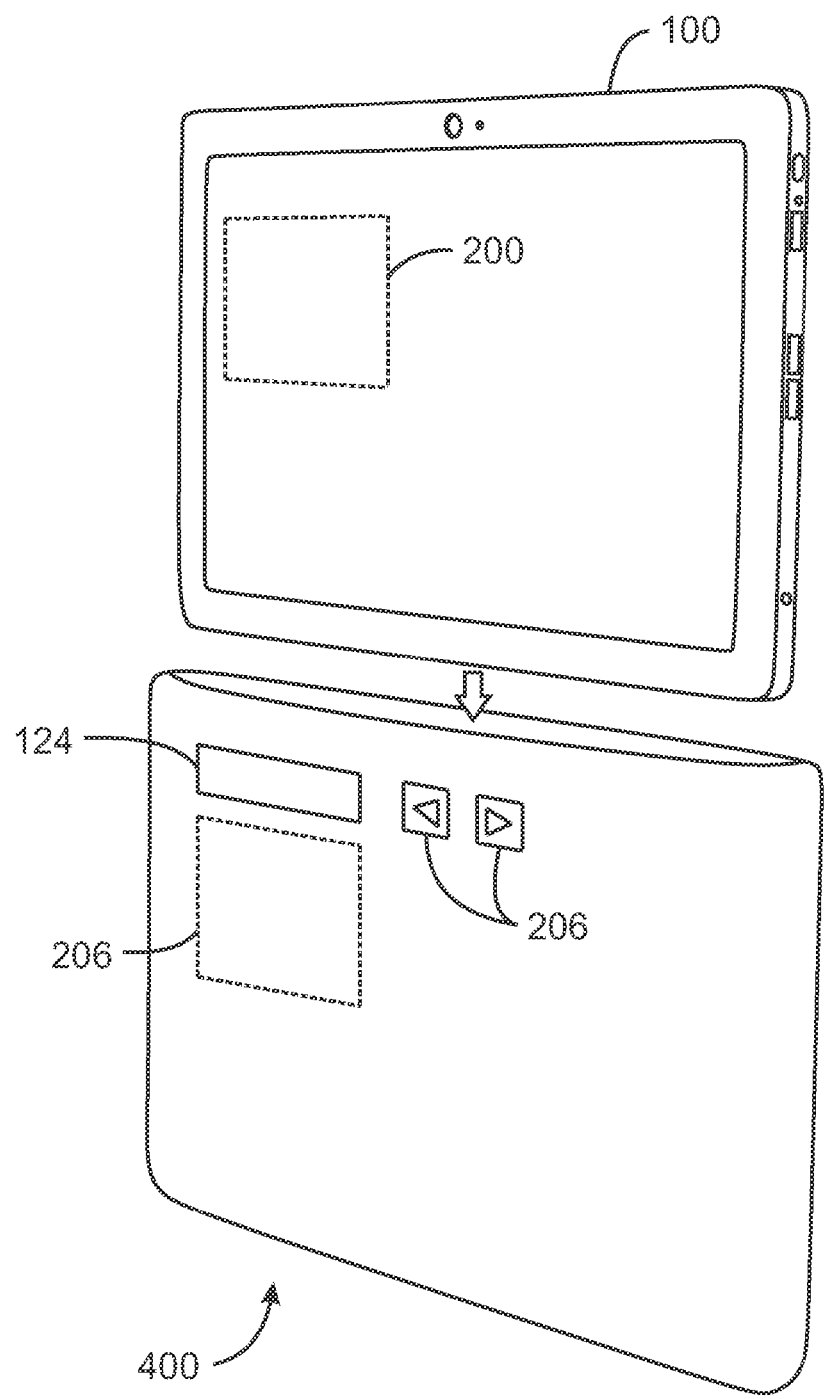
FIG. 4 is an example of a secondary display included in a carrying case for a computing device.

FIG. 4 is an example of a secondary display included in a carrying case for a computing device. The computing device 100 shown in FIG. 4 is a tablet computer. However, the computing device 100 could also be a laptop computer or a smart phone, among others. The carrying case 400 is shown in FIG. 4 as a sleeve into which the computing device 100 can be inserted. However, other configurations are possible. For example, the carrying case can be a folio-type case that can be folded open to reveal the front surface of the tablet. The carrying case 400 includes the secondary display 124, which may be any suitable size and may be larger or smaller than the display shown in FIG. 4. When the carrying case 400 is disposed over the computing device 100, the antenna 206 in the carrying case 400 is positioned adjacent to the antenna 200 in the computing device 100, enabling communication between the computing device 100 and the secondary display 124.

In this example, the computing device 100 can remain in the carrying case 400 while the user is still being able to receive information from the computing device 100. For example, the computing device 100 may use the secondary display 124 to display time and date information, information about the tablet such as temperature battery level, reminders, appointments stored in a calendaring application, and the like. The computing device 100 may also use the secondary display 124 to display information about received messages such as email messages or text messages. The user may be able to select the type of information to be delivered by the computing device 100 to the secondary display 124.

The example carrying case 400 of FIG. 4 also includes input devices 126. The input devices 126 are shown as buttons that a user can press to send input to the computing device 100 without taking the computing device 100 out of the carrying case 400. For example, the buttons may enable a user to scroll through a list of email messages or scroll through the text of a particular email message. The pressing a button can cause input to be received by the computing device 100 through the antenna 200. In response, the computing device 100 may deliver a new image to the secondary display 124.

Figure 5:
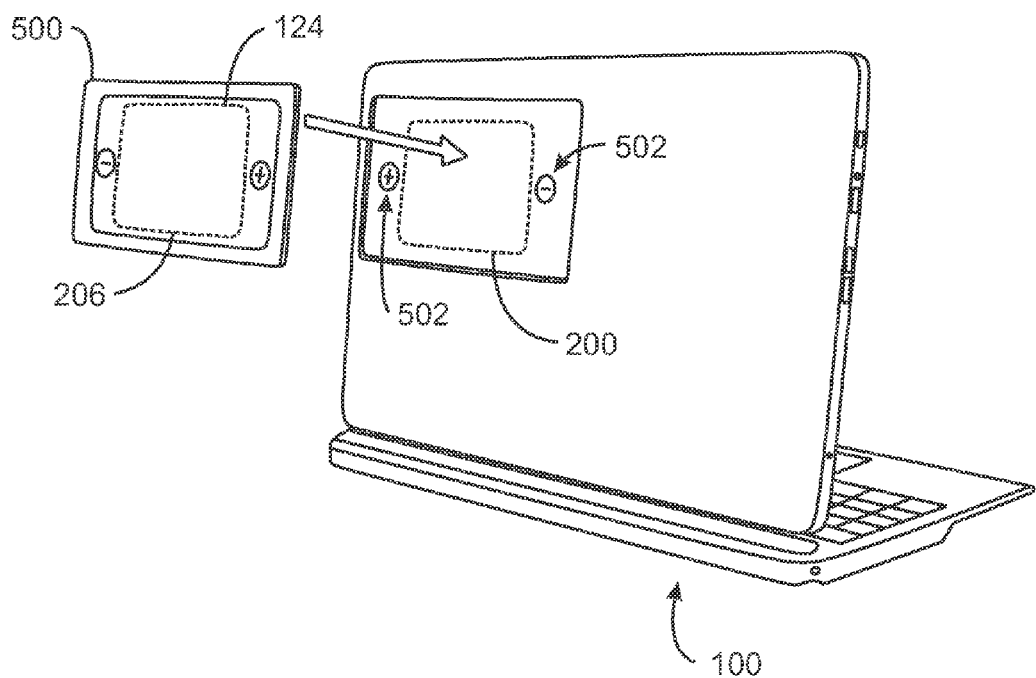
FIG. 5 is an example of a secondary display included in a removable card that can be coupled to a computing device.

FIG. 5 is an example of a secondary display included in a removable card that can be coupled to a computing device. The computing device 100 shown in FIG. 5 is a laptop computer. However, the computing device 100 could also be a tablet computer or a smart phone, among others. The card 500 includes the secondary display 124, which may be any suitable size and may be larger or smaller than the display shown in FIG. 5. When the card 500 is disposed over the computing device 100, the antenna 206 in the card 500 is positioned adjacent to the antenna 200 in the computing device 100, enabling communication between the computing device 100 and the secondary display 124.

The card 500 can be held in place by any suitable mechanism, including any suitable type of latch or snap. The card 500 shown in FIG. 5 is held in place, at least in part, by magnets 502. The position and polarity of the magnets 502 can be arranged to ensure proper alignment of the card 500 with the computing device. In some examples, the card 500 can be coupled to the computing device 100 by a more durable coupling mechanism such as screws or bolts.

The secondary display 124 of the card can be used for a variety of purposes. In some cases, the user may simply use the secondary display 124 for device personalization, similar to attaching a bumper sticker. The secondary display 124 might include text, patterns, images, or some combination thereof. Additionally, the removable nature of the card 500 may be useful in instances where the user wants to detach the card 500 for later use separate from the computing device 100. For example, the user may be traveling by commercial airline. The user could send an image of the boarding pass to the card 500, detach the card 500 from the computing device 100, and put the computing device 100 in a laptop carrier. The card provides a light, highly-portable mechanism for displaying the boarding pass.

Figure 6:
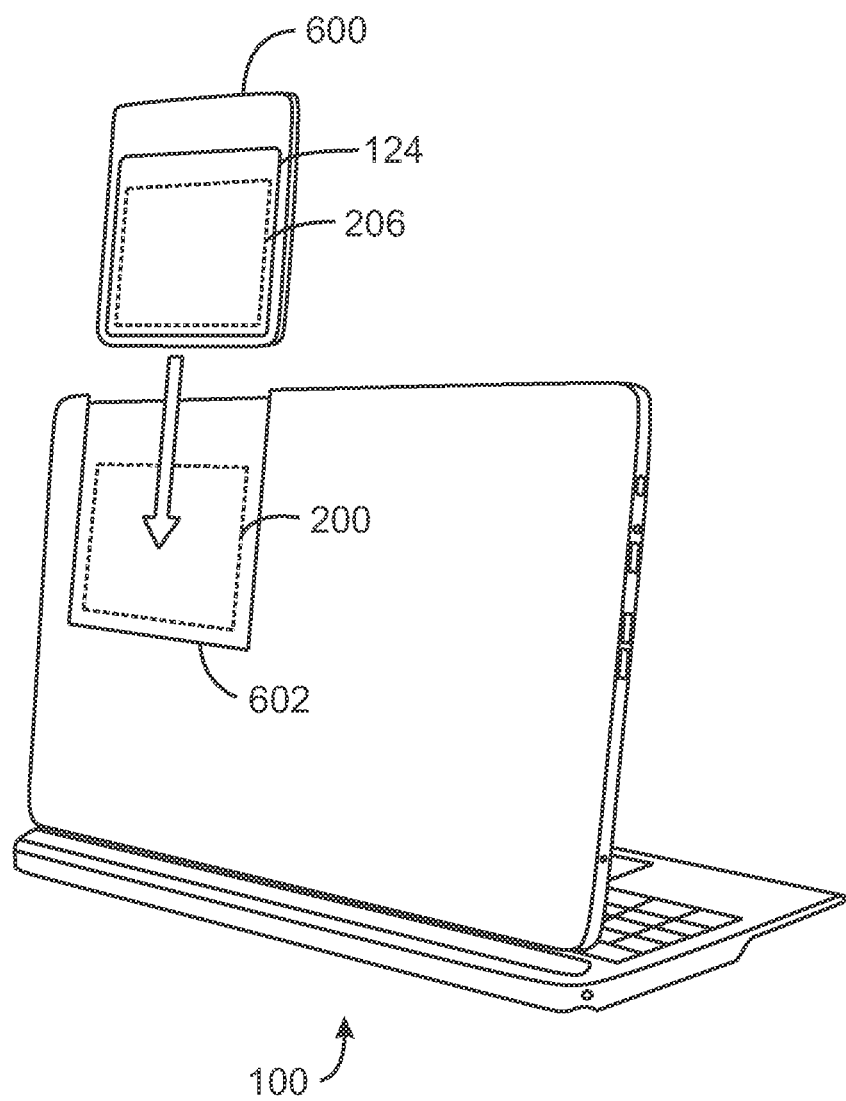
FIG. 6 is another example of a secondary display included in a removable card that can be coupled to a computing device.

FIG. 6 is another example of a secondary display included in a removable card that can be coupled to a computing device. As in FIG. 5, the computing device 100 shown in FIG. 6 is a laptop computer and the secondary display 124 is included in the removable card 600. The operation of the secondary display 124 may be substantially as described in relation to FIG. 5. However, FIG. 6 provides a different type of coupling mechanism. Specifically, the card 600 is coupled to the computing device 100 by sliding into a slot on the chassis of the computing device 100. When the card 600 is fully seated, the antenna 206 of the card 600 aligns with the antenna 200 of the computing device 100. In addition to the slot, the chassis may also include additional mechanisms for holding the card in place, such as detents or a clasp, for example.

Figure 7:
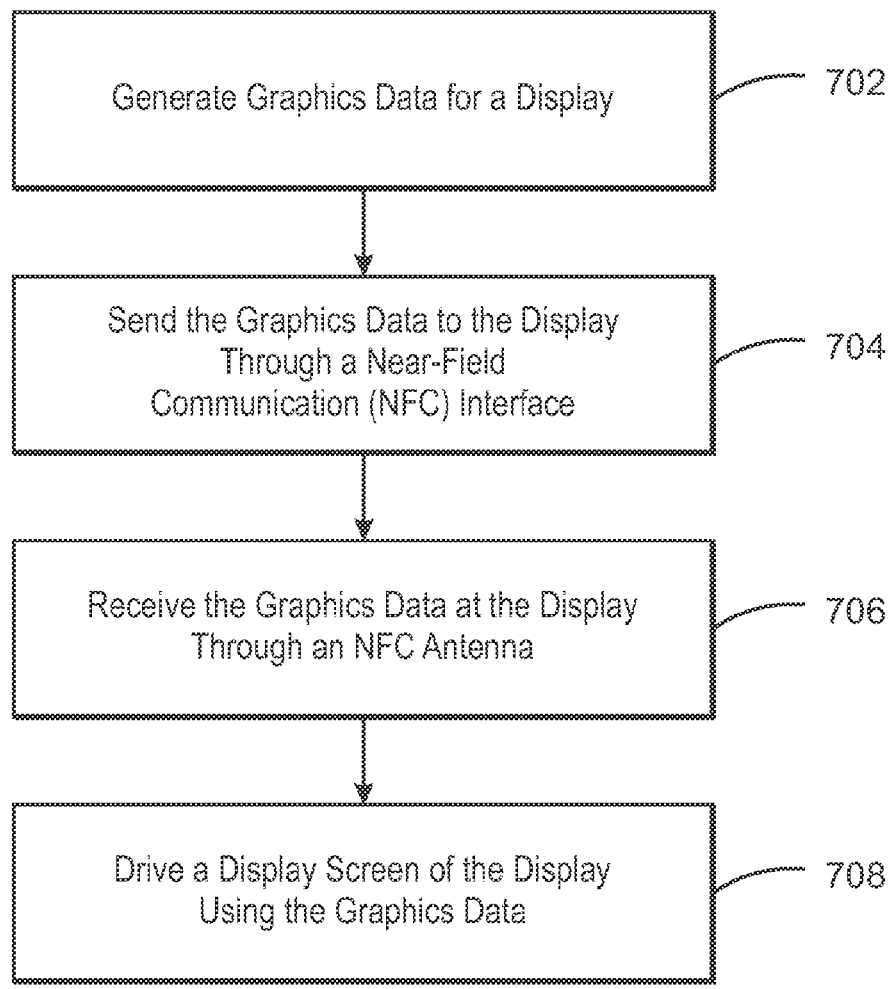
FIG. 7 is a process flow diagram summarizing a method of operating a display.

FIG. 7 is a process flow diagram summarizing a method of operating a display. Blocks 702 and 704 of the method 700 may be performed by the computing device 100, and blocks 706 and 708 may be performed by the secondary display 124. The method may begin at block 702.

At block 702, display data generated by the computing device. The display data is data to be used by a display driver for generating an image in a display screen. At block 704, the display data is sent from the computing device to the display through a near-field communication (NFC) interface. The transmission of data to the display through the NFC interface also provides power to the display. At block 706, the display receives the display data through an NFC antenna. At block 708, the display drives a display screen of the display using the display data. Driving the display can include generating in image on a bistable display such as an E-paper display.

FIG. 7 is not intended to indicate that the steps of the method 700 are to be executed in any particular order, or that all of the steps of the method 700 are to be included in every case. Further, any number of additional steps may be included within the method 700, depending on the specific application.

Examples may include subject matter such as a method, means for performing acts of the method, at least one machine-readable medium including instructions that, when performed by a machine cause the machine to performs acts of the method, or of an apparatus or system for printing a three-dimensional object and/or monitoring the printing of a three-dimensional object according to embodiments and examples described herein.

Example 1 is a computing device with a secondary display. The computing device includes a chassis, a primary display, and a near-field communication interface to transmit display data to a secondary display.

Example 2 includes the computing device of example 1. In example 2, the secondary display is a bistable display that maintains a generated image without consuming electrical energy.

Example 3 includes the computing device of any combination of examples 1-2. In example 3, the secondary display is an E-paper display.

Example 4 includes the computing device of any combination of examples 1-3. In example 4, the secondary display is powered solely by energy received from the near-field communications interface.

Example 5 includes the computing device of any combination of examples 1-4. In example 5, the secondary display comprises a display driver coupled to a display screen via a low power bus.

Example 6 includes the computing device of any combination of examples 1-5. In example 6, the secondary display is attachable to the chassis.

Example 7 includes the computing device of any combination of examples 1-6. In example 7, the computing device is a smart phone and the secondary display is included in a protective phone cover.

Example 8 includes the computing device of any combination of examples 1-7. In example 8, the computing device is a tablet computer and the secondary display is included in a carrying case.

Example 9 includes the computing device of any combination of examples 1-8. In example 9, the computing device is a laptop computer and the secondary display is included in a card that can be coupled to a chassis of the laptop computer.

Example 10 includes the computing device of any combination of examples 1-9. In example 10, the secondary display includes circuitry for transmitting user input to the computing device.

Example 11 is a display device to receive display data through a wireless interface. The display device includes a display screen; a near-field communications antenna; a microcontroller to receive display data through the near-field communications antenna; and a display driver to receive the display data from the microcontroller and drive the display screen with the display data.

Example 12 includes the display device of example 11. In example 12.

Example 13 includes the display device of any combination of examples 11-12. In example 13, the display screen is an E-paper display.

Example 14 includes the display device of any combination of examples 11-13. In example 14, the display device is powered solely by energy received from the near-field communications antenna.

Example 15 includes the display device of any combination of examples 11-14. In example 15, the display device includes a low-power bus to couple the display driver to the display screen.

Example 16 includes the display device of any combination of examples 11-15. In example 16, the display device is configured to be removably attached to a chassis of a computing device.

Example 17 includes the display device of any combination of examples 11-16. In example 17, the computing device is a smart phone and the display device is included in a protective phone cover.

Example 18 includes the display device of any combination of examples 11-17. In example 18, the computing device is a tablet computer and the display device is included in a carrying case.

Example 19 includes the display device of any combination of examples 11-18. In example 19, the computing device is a laptop computer and the display device is included in a card that can be coupled to a chassis of the laptop computer.

Example 20 includes the display device of any combination of examples 11-19. In example 20, circuitry for transmitting user input to the computing device through the near-field communications antenna.

Example 21 is method of driving a display. The method of example 21 includes generating, by a computing device, display data for a display; and sending the display data from the computing device to the display through a near-field communication (NFC) interface.

Example 22 includes the method of example 21. In example 22, the method includes powering the display through the NFC interface.

Example 23 includes the method of any combination of examples 21-22. In example 23, the method includes receiving, by the display, the display data through an NFC antenna; and driving a display screen of the display using the display data.

Example 24 includes the method of any combination of examples 21-23. In example 24, driving the display comprises generating an image on a bistable display.

Example 25 includes the method of any combination of examples 21-24. In example 25, driving the display comprises generating an image on an E-paper display.

Example 26 includes the method of any combination of examples 21-25. In example 26, comprising receiving, at the computing device, an acknowledgement from the display through the NFC interface, the acknowledgement indicating to the computing device that the display data was received.

Example 27 includes the method of any combination of examples 21-26. In example 27, the method includes receiving data from the display through the NFC interface at the computing device, wherein the data includes information that relates to features of the secondary display.

Example 28 includes the method of example 27. In example 28, the information identifies screen dimensions of the secondary display.

Example 29 includes the method of any combination of examples 21-28. In example 29, the method includes receiving data from the display through the NFC interface at the computing device, wherein the data includes user input data.

Example 30 includes the method of example 29. In example 30, the user input data causes the computing device to send new display data to the display.

Example 31 is a method of driving a display. The method includes receiving display data through an NFC antenna from a computing device; and driving a display screen of the display using the display data.

Example 32 includes the method of example 31. In example 32, the method includes receiving power to drive the display screen through the NFC antenna. Optionally, Example 33 includes the method of any combination of examples 31-32. In example 33, driving the display comprises generating an image on a bistable display.

Example 34 includes the method of any combination of examples 31-33. In example 34, driving the display comprises generating an image on an E-paper display.

Example 35 includes the method of any combination of examples 31-34. In example 35, the method includes sending an acknowledgement to the computing device after receiving the display data.

Example 36 includes the method of any combination of examples 31-35. In example 36, the method includes receiving, at the computing device, an acknowledgement from the display through the NFC antenna, the acknowledgement indicating to the computing device that the display data was received.

Example 37 includes the method of any combination of examples 31-36. In example 37, the method includes receiving data from the display through the NFC antenna at the computing device, wherein the data includes information that relates to features of the secondary display.

Example 38 includes the method of example 37. In example 38, the information identifies screen dimensions to computing device.

Example 39 includes the method of any combination of examples 31-38. In example 39, the method includes receiving data from the display through the NFC antenna at the computing device, wherein the data includes user input data.

Example 40 includes the method of example 39. In example 40, the user input data causes the computing device to send new display data to the display.

Example 41 is a non-transitory, computer-readable medium having instructions stored thereon that, when executed by a processor, direct the processor to send display data to a display. The computer-readable medium includes instructions that direct the processor to generate display data for a display; and send the display data to the display through a near-field communication (NFC) interface.

Example 42 includes the computer-readable medium of example 41. In this example, the computer-readable includes instructions to direct the processor to receive an acknowledgement from the display through the NFC interface, the acknowledgement indicating that the display data was received.

Example 43 includes the computer-readable medium of any one of claims 41 to 42. In this example, the data includes information that relates to features of the secondary display. Optionally, the information identifies screen dimensions, and wherein the instructions direct the processor to transmit display information that conforms to the screen dimensions.

Example 44 includes the computer-readable medium of any one of claims 41 to 43, including or excluding optional features. In this example, the computer-readable medium includes instructions to direct the processor to receive user input data from the display through the NFC interface, and in response to the user input data, send new display data to the display.

Example 45 is an apparatus for sending display data to a secondary display. The apparatus includes means for generating display data for a display; and means for sending the display data to the display through a near-field communication (NFC) interface.

Example 46 includes the apparatus of example 45. In this example, the apparatus includes means for receiving an acknowledgement from the display through the NFC interface, the acknowledgement indicating that the display data was received.

Example 47 includes the apparatus of any one of claims 35 to 36. In this example, the apparatus includes means for receiving data from the display through the NFC interface, wherein the data includes information that relates to features of the secondary display. Optionally, the information identifies screen dimensions, and the means for generating uses the screen dimensions to generate display data that conforms to the screen dimensions.

Example 48 includes the apparatus of any one of claims 45 to 47, including or excluding optional features. In this example, the apparatus includes means for receiving user input data from the display through the NFC interface, wherein the means for sending send new display data to the display in response to the user input data.

In the above description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, described herein. The various appearances "an embodiment," "one embodiment," or "some embodiments" are not necessarily all referring to the same embodiments.

Not all components, features, structures, or characteristics described and illustrated herein are to be included in a particular embodiment or embodiments in every case. If the specification states a component, feature, structure, or characteristic "may", "might", "can" or "could" be included, for example, that particular component, feature, structure, or characteristic may not be included in every case. If the specification or claims refer to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein may not be arranged in the particular way illustrated and described herein. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the machine readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus, comprising:
   a computing device comprising:
      a chassis;
      a processor to generate display data;
      a primary display to receive display data from the processor through a communication bus; and
      a first near-field communication antenna; and
   a secondary display device comprising:
      a bistable display that maintains a generated image without consuming electrical energy; and
      a second near-field communication antenna to receive display data from the processor through the first near-field communication antenna;
   wherein the chassis comprises a mechanical coupling mechanism that enables the secondary display device to be attached to or disconnected from the computing device and, when attached, aligns the first near-field communication antenna with the second near-field communication antenna to enable a near-field communication interface.

2. The apparatus of claim 1, wherein the secondary display device comprises an E-paper display.

3. The apparatus of claim 1, wherein the secondary display device is powered solely by energy received from the near-field communication interface.

4. The apparatus of claim 1, wherein the secondary display device comprises a display driver coupled to a display screen via a low power bus.

5. The apparatus of claim 1, wherein the computing device is a smart phone and the secondary display device is included in a protective phone cover.

6. The apparatus of claim 1, wherein the computing device is a tablet computer and the secondary display device is included in a carrying case.

7. The apparatus of claim 1, wherein the computing device is a laptop computer and the secondary display device is included in a card that can be coupled to an external surface of a chassis of the laptop computer.

8. The apparatus of claim 1, wherein the secondary display device comprises circuitry for transmitting user input to the computing device.

9. A display device, comprising:
- a display screen comprising a bistable display that maintains a generated image without consuming electrical energy;
- a first near-field communication antenna;
- a microcontroller to receive display data from a computing device through the first near-field communication antenna, wherein the computing device comprises a primary display and a second near-field communication antenna; and
- a display driver to receive the display data from the microcontroller and drive the display screen with the display data;
- wherein the display device is attachable to the computing device by a mechanical coupling mechanism that aligns the first near-field communication antenna with the second near-field communication antenna to enable a near-field communication interface.

10. The display device of claim 9, wherein the display screen is an E-paper display.

11. The display device of claim 9, wherein the display device is powered solely by energy received from the second near-field communication antenna.

12. The display device of claim 9, comprising a low-power bus to couple the display driver to the display screen.

13. The display device of claim 9, wherein the computing device is a smart phone and the display device is included in a protective phone cover.

14. The display device of claim 9, wherein the computing device is a tablet computer and the display device is included in a carrying case.

15. The display device of claim 9, wherein the computing device is a laptop computer and the display device is included in a card that can be coupled to an external surface of a chassis of the laptop computer.

16. The display device of claim 9, comprising circuitry for transmitting user input to the computing device through the first near-field communication antenna.

17. A method, comprising:
- generating, by a processor of a computing device, first display data for a primary display; and
- sending the first display data from the processor to the primary display through a communication bus;
- receiving a coupling of a secondary display via a mechanical coupling mechanism that aligns a first near-field communication (NFC) antenna of the computing device with a second NFC antenna of the secondary display to enable a NFC interface between the computing device and the secondary display;
- generating, by the processor of the computing device, second display data for the secondary display; and
- sending the second display data from the processor to the secondary display through the NFC interface.

18. The method of claim 17, comprising powering the secondary display through the NFC interface.

19. The method of claim 17, comprising:
- receiving, by the secondary display, the second display data through the second NFC antenna; and
- driving a display screen of the secondary display using the second display data.

20. The method of claim 19, wherein driving the display screen comprises generating an image on a bistable display.

21. The method of claim 19, wherein driving the display screen comprises generating an image on an E-paper display.

* * * * *